(12) United States Patent
Park et al.

(10) Patent No.: US 11,929,457 B2
(45) Date of Patent: Mar. 12, 2024

(54) BOLTING DEVICE FOR MANUFACTURING BATTERY PACK

(71) Applicant: LG CHEM, LTD., Seoul (KR)

(72) Inventors: Hyeong-Min Park, Daejeon (KR); Seok-Won Jeung, Daejeon (KR); Geon-Tae Park, Daejeon (KR); Jung-Ho Oh, Daejeon (KR); Ju-Hwan Baek, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 336 days.

(21) Appl. No.: 17/051,393

(22) PCT Filed: Dec. 12, 2019

(86) PCT No.: PCT/KR2019/017608
§ 371 (c)(1),
(2) Date: Oct. 28, 2020

(87) PCT Pub. No.: WO2020/153602
PCT Pub. Date: Jul. 30, 2020

(65) Prior Publication Data
US 2021/0046621 A1  Feb. 18, 2021

(30) Foreign Application Priority Data
Jan. 25, 2019  (KR) .................. 10-2019-0010135

(51) Int. Cl.
*H01M 10/04* (2006.01)
*B25B 21/00* (2006.01)
(Continued)

(52) U.S. Cl.
CPC ......... *H01M 10/0404* (2013.01); *B25B 21/00* (2013.01); *B25B 23/005* (2013.01);
(Continued)

(58) Field of Classification Search
None
See application file for complete search history.

(56) References Cited

U.S. PATENT DOCUMENTS

| 2004/0006861 A1 | 1/2004 | Haytayan |
| 2010/0083610 A1 | 4/2010 | King |

(Continued)

FOREIGN PATENT DOCUMENTS

| CN | 1646270 A | 7/2005 |
| CN | 101868884 A | 10/2010 |

(Continued)

OTHER PUBLICATIONS

Abstract of De 102008059971A1. (Year: 2010).*
(Continued)

*Primary Examiner* — Gregg Cantelmo
(74) *Attorney, Agent, or Firm* — Birch. Stewart, Kolasch & Birch, LLP

(57) ABSTRACT

Discussed is a bolting device that effectively protects an internal configuration of a battery pack and increases manufacturing efficiency during a bolting operation. The bolting device for manufacturing a battery pack includes an electric screwdriver provided with a rotation motor; a driver bit connected to the rotation motor to enable a rotation movement and configured to rotate a bolt; a bit guide member provided with a hollow tube such that the driver bit is inserted into an inside of the hollow tube to be movable; and a guide jig provided with a main body configured to be mounted on an upper portion of a pack housing, the main body having a plate shape and having at least one through hole, and a fixing member inserted into the through hole and mounted therein, and having an insertion hole.

10 Claims, 12 Drawing Sheets

(51) Int. Cl.
  *B25B 23/00*  (2006.01)
  *B25B 23/10*  (2006.01)
  *H01M 50/213*  (2021.01)
  *H01M 50/244*  (2021.01)
  *H01M 50/249*  (2021.01)
  *H01M 50/271*  (2021.01)

(52) U.S. Cl.
  CPC ......... *B25B 23/105* (2013.01); *H01M 50/213* (2021.01); *H01M 50/244* (2021.01); *H01M 50/249* (2021.01); *H01M 50/271* (2021.01); *H01M 2220/20* (2013.01)

(56) References Cited

U.S. PATENT DOCUMENTS

| | | | | |
|---|---|---|---|---|
| 2011/0293980 | A1* | 12/2011 | Tartaglia | H01M 50/24 429/100 |
| 2012/0100399 | A1* | 4/2012 | Adachi | B60L 58/12 429/7 |
| 2012/0204406 | A1 | 8/2012 | Opper et al. | |
| 2013/0136970 | A1* | 5/2013 | Kurokawa | H01M 50/262 429/99 |
| 2013/0309536 | A1* | 11/2013 | Wu | H01M 50/209 429/99 |
| 2014/0220396 | A1* | 8/2014 | Lee | H01M 10/425 429/61 |
| 2015/0349389 | A1* | 12/2015 | Kobune | H01M 50/213 429/90 |
| 2017/0133640 | A1* | 5/2017 | Dudley | H01M 50/244 |
| 2017/0214013 | A1* | 7/2017 | Benedict | H01M 50/264 |
| 2018/0114961 | A1 | 4/2018 | Kim et al. | |
| 2019/0148799 | A1* | 5/2019 | Lim | H01M 10/613 429/120 |

FOREIGN PATENT DOCUMENTS

| | | | | |
|---|---|---|---|---|
| DE | 9100459.4 | U1 | 5/1991 | |
| DE | 102008059971 | A1 * | 6/2010 | ......... B60L 11/1874 |
| GB | 2560166 | A | 9/2018 | |
| JP | 4-23231 | U | 2/1992 | |
| JP | 11-198055 | A | 7/1999 | |
| JP | 11-333739 | A | 12/1999 | |
| JP | 2000-158249 | A | 6/2000 | |
| JP | 2003-103409 | A | 4/2003 | |
| JP | 2006-50769 | A | 2/2006 | |
| JP | 2012-94330 | A | 5/2012 | |
| JP | 2015-11819 | A | 1/2015 | |
| KR | 10-2018-0044083 | A | 5/2018 | |

OTHER PUBLICATIONS

International Search Report for PCT/KR2019/017608 (PCT/ISA/210) dated Apr. 1, 2020.
Extended European Search Report for European Application No. 19911426.5, dated Jan. 31, 2022.

* cited by examiner

BOLTING DEVICE FOR MANUFACTURING BATTERY PACK

TECHNICAL FIELD

The present disclosure relates to a bolting device for manufacturing a battery pack, and more particularly, to a bolting device that effectively protects the internal configuration of a battery pack and increases manufacturing efficiency during a bolting operation.

The present application claims priority to Korean Patent Application No. 10-2019-0010135 filed on Jan. 25, 2019 in the Republic of Korea, the disclosures of which are incorporated herein by reference.

BACKGROUND ART

Currently commercialized secondary batteries include nickel cadmium batteries, nickel hydrogen batteries, nickel zinc batteries, lithium secondary batteries, and the like. Among these secondary batteries, because lithium secondary batteries have almost no memory effect compared to nickel-based secondary batteries, lithium secondary batteries are in the spotlight owing to the advantages of free charge and discharge, very low self discharge rate, and high energy density.

Such a lithium secondary battery mainly uses lithium-based oxides and carbon materials as positive electrode active material and negative electrode active materials, respectively. The lithium secondary battery includes an electrode assembly in which a positive electrode plate and a negative electrode plate coated with a positive electrode active material and a negative electrode active material respectively are arranged with a separator interposed therebetween, and a sheath material, that is, a battery pouch sheath material, that seals and accommodates the electrode assembly together with an electrolyte solution.

Recently, secondary batteries are widely used not only in small devices such as portable electronic devices but also in medium and large devices such as vehicles and energy storage systems. When secondary batteries are used in such medium and large devices, a large number of secondary batteries are electrically connected in order to increase capacity and output power. In particular, pouch type secondary batteries are widely used in such medium and large devices because of advantages such as easy lamination.

Meanwhile, recently, as a need for a large-capacity structure has been increased, including utilization as an energy storage source, a demand for a battery pack having a plurality of secondary batteries electrically connected in series and/or in parallel and a module case that accommodates such secondary batteries therein and a battery management system (BMS) has increased.

In addition, it is common for such a battery pack to be further provided with an external housing formed of a metal material to protect a plurality of secondary batteries from external impact or accommodate and store the plurality of secondary batteries, separately from the module case. In addition, the module case accommodated in the external housing needed to be fixed to the inside of the external housing such that an internal shaking does not occur. This is to prevent an internal collision between internal configurations (the module case, a bus bar, a secondary battery, etc.) of the battery pack from occurring secondarily or an electrical short circuit from occurring when an external impact occurs.

Moreover, in the related art, there are cases in which bolt fastening is used to fix the module case in an inner space of the external housing. However, at this time, since the inside of the external housing is narrow, it is difficult to visually check the fastening position between the module case and the external housing, which is a factor to increase the manufacturing time because there are many cases in which a bolt is not engaged in the fastening position or escapes from the fastening position during the bolting operation.

In addition, in the related art, when a driver bit used for the bolting operation rotates, the driver bit escapes from the fastening position due to an operation vibration and the driver bit collides with the module case or the bus bar, which greatly increases the possibility of damaging the internal parts. Accordingly, a process of inserting and fixing (fastening) the module case inside the external housing is difficult and takes considerable time. As a result, the manufacturing cost of the battery pack has increased.

DISCLOSURE

Technical Problem

The present disclosure is designed to solve the problems of the related art, and therefore the present disclosure is directed to providing a bolting device that effectively protects the internal configuration of a battery pack and increases manufacturing efficiency during a bolting operation.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a bolting device for manufacturing a battery pack provided with a pack housing having a box shape with an open upper portion and a module case accommodating a plurality of secondary batteries, The bolting device comprising an electric screwdriver provided with a rotation motor; a driver bit connected to the rotation motor to enable a rotation movement and configured to rotate a bolt head; a bit guide member provided with a hollow tube such that the driver bit is inserted into an inside of the hollow tube to be movable; and a guide jig provided with a main body mounted on an upper portion of the pack housing, comprising at least one through hole, and having a plate shape, and a fixing member inserted into the through hole and mounted therein, comprising an insertion hole that is perforated such that the bit guide member is inserted, and protruding in a direction in which the module case is located.

A fixing protrusion portion bulging in an outer direction so as to be inserted into and fixed to an upper end of the pack housing may be formed in the main body of the guide jig.

The bit guide member may be configured such that an end portion of the hollow tube in an elongated direction is coupled to the electric screwdriver.

The bit guide member may be configured such that a part of the hollow tube is inserted into and coupled to the insertion hole of the fixing member.

At least one mounting groove extending from the insertion hole and indented in a lower direction may be provided in an upper surface of the fixing member.

The bit guide member may be provided with a fixing protrusion protruding and extending in an outer direction from the upper end of the hollow tube so as to be inserted into and fixed to the mounting groove.

The module case may be provided with an outer wall forming an inner space accommodating the plurality of secondary batteries, and a coupling hole protruding in an outer direction from the outer wall and perforated such that a bolt body is inserted and fixed.

The pack housing may be formed with an inner space to accommodate the module case and is provided with a coupling groove communicating with a coupling hole of the module case such that the module case and the pack housing are bolt coupled to each other and the bolt body is inserted and fixed.

The bit guide member may be provided with a fixing portion to fix an end portion of the bit guide member to a peripheral portion of the coupling hole of the module case.

The fixing portion may be provided with a hook structure protruding and extending from the end portion of the bit guide member so as to surround the peripheral portion of the coupling hole.

The bit guide member may be configured such that the end portion of the bit guide member in the bolt fastening direction is inserted into the insertion groove formed in the peripheral portion of the coupling hole of the module case.

The bit guide member may be provided with a detection protrusion configured to detect a degree of warpage of the driver bit on at least one part of an inner surface of the hollow tube.

In another aspect of the present disclosure, there is provided a battery pack manufactured using the bolting device.

In another aspect of the present disclosure, there is provided a vehicle including the battery pack.

Advantageous Effects

According to an aspect of the present disclosure, by providing a guide jig provided with a main body mounted on the upper portion of a pack housing and a fixing member that fixes a bit guide member, a bolting device may accurately set the insertion position of a driver bit in advance, and stably fix the bit guide member, and thus during a bolting operation, it is possible to prevent the occurrence of bolting defects due to an operating impact, and shorten the bolting operation time, thereby greatly improving manufacturing efficiency.

In addition, according to an aspect of an embodiment of the present disclosure, the bit guide member is configured such that the end portion of a hollow tube in the elongated direction is coupled to an electric screwdriver, and thus during the bolting operation, it is possible to prevent the driver bit from colliding with the pack housing and a module case in advance, thereby preventing damage to the internal configuration of a battery pack.

According to another aspect of the present disclosure, the bit guide member is configured to be inserted into and coupled to the insertion hole of the fixing member, and thus when an operator performs the bolting operation using the bolting device, it is unnecessary to insert the bit guide member into the insertion hole of each of four fixing members, the bolting device has an advantage of greatly shortening the bolting operation time.

Further, according to another aspect of the present disclosure, at least one mounting groove is provided in the upper surface of the fixing member, and the bit guide member is provided with a fixing protrusion to be inserted into and fixed to the mounting groove, and thus the bolting device may prevent the bit guide member from shaking during a rotation movement of the driver bit, and in particular, may improve the fixing force of the guide jig capable of maintaining the state in which the driver bit is erected vertically.

In addition, according to another aspect of the present disclosure, the bit guide member is provided with a fixing portion configured to fix the end portion to the peripheral portion of a coupling hole of the module case, and thus the upper portion of the bit guide member is fixed by the guide jig not to shaking, and the lower portion of the bit guide member is fixed by the fixing portion not to shaking. Accordingly, since both the upper and the lower ends of the bit guide member are stably fixed, the bolting device of the present disclosure may prevent a problem in which the bit guide member escapes from the right position during the bolting operation, thereby effectively reducing a defective rate of the bolting operation and an operation time.

Moreover, according to another aspect of the present disclosure, the bit guide member is configured such that the end portion in the bolt fastening direction is inserted into the insertion groove formed in the peripheral portion of the coupling hole of the module case such that the upper portion of the hollow tube is fixed by the guide jig and the lower portion is inserted into and fixed to the insertion groove of the module case, thereby not only guiding the driver bit to be positioned on a correct position, but also effectively preventing the bit guide member from escaping from the right position due to the impact of the driver bit during the bolting operation. Accordingly, the defective rate of a manufacturing process of the battery pack may be reduced, and manufacturing efficiency may be greatly improved.

According to another aspect of the present disclosure, the bit guide member is provided with a detection protrusion configured to detect a degree of warpage of the driver bit on at least one part of the inner surface of the hollow tube, and thus the operator may easily detect the warpage of the driver bit and prevent the use of the warped driver bit, thereby effectively preventing damage to the internal configuration of the battery pack due to the bolting operation.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
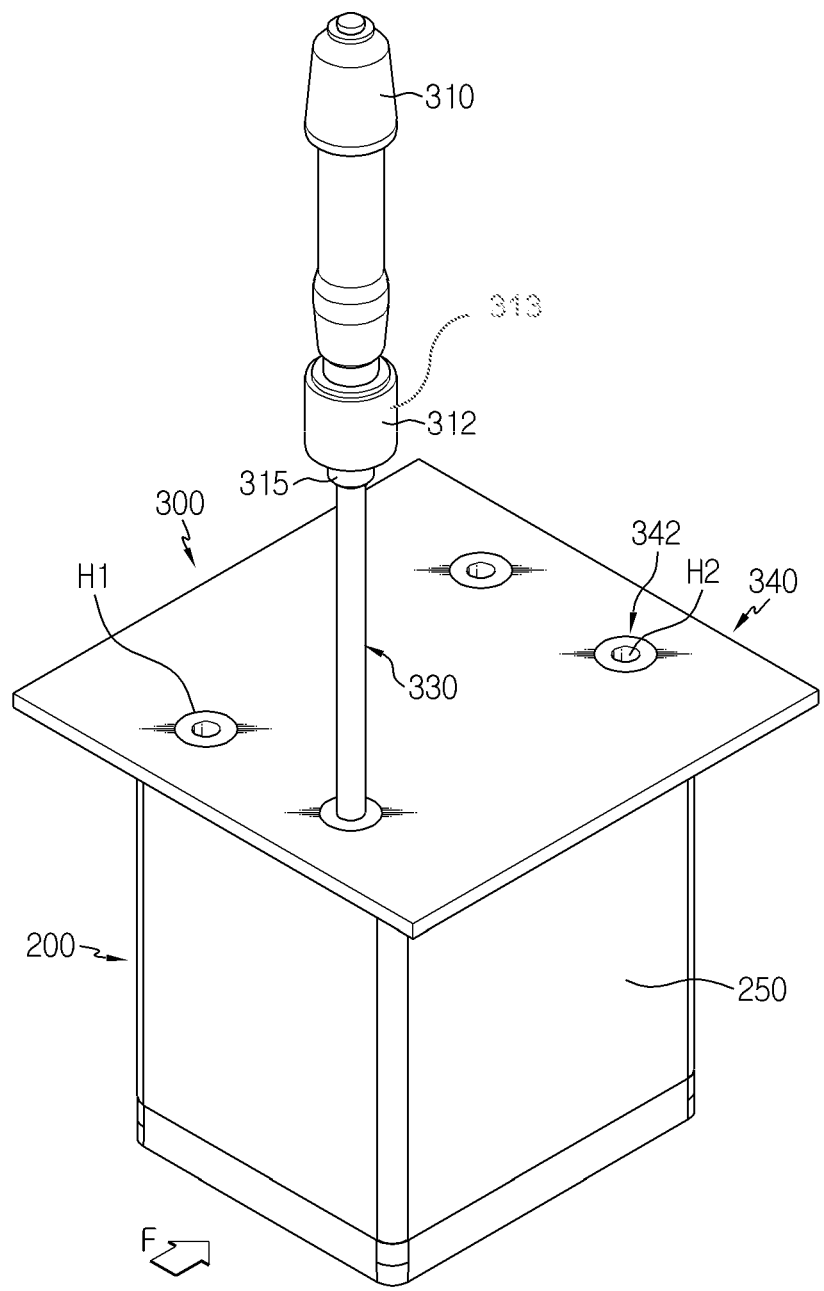
FIG. 1 is a perspective view schematically showing a battery pack manufactured by using a bolting device according to an embodiment of the present disclosure.
Figure 2:
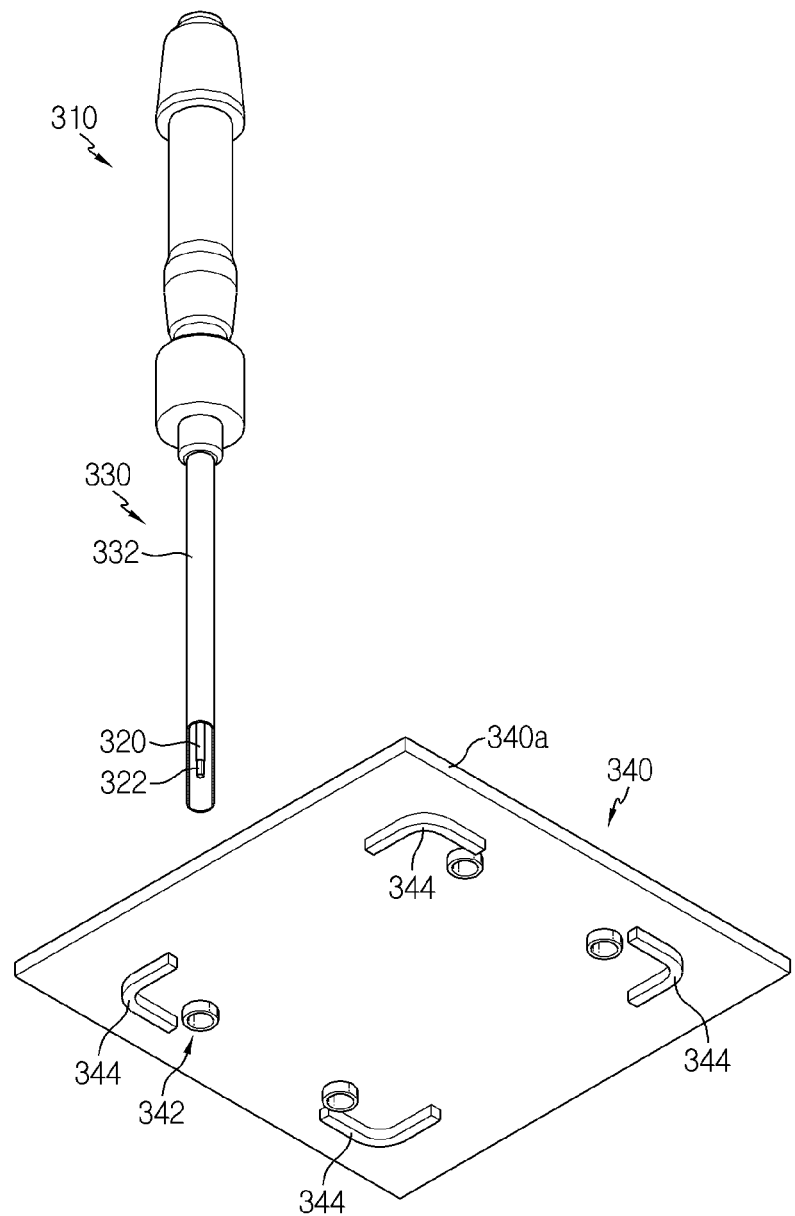
FIG. 2 is an exploded perspective view schematically showing separated components of a bolting device according to an embodiment of the present disclosure.
Figure 3:
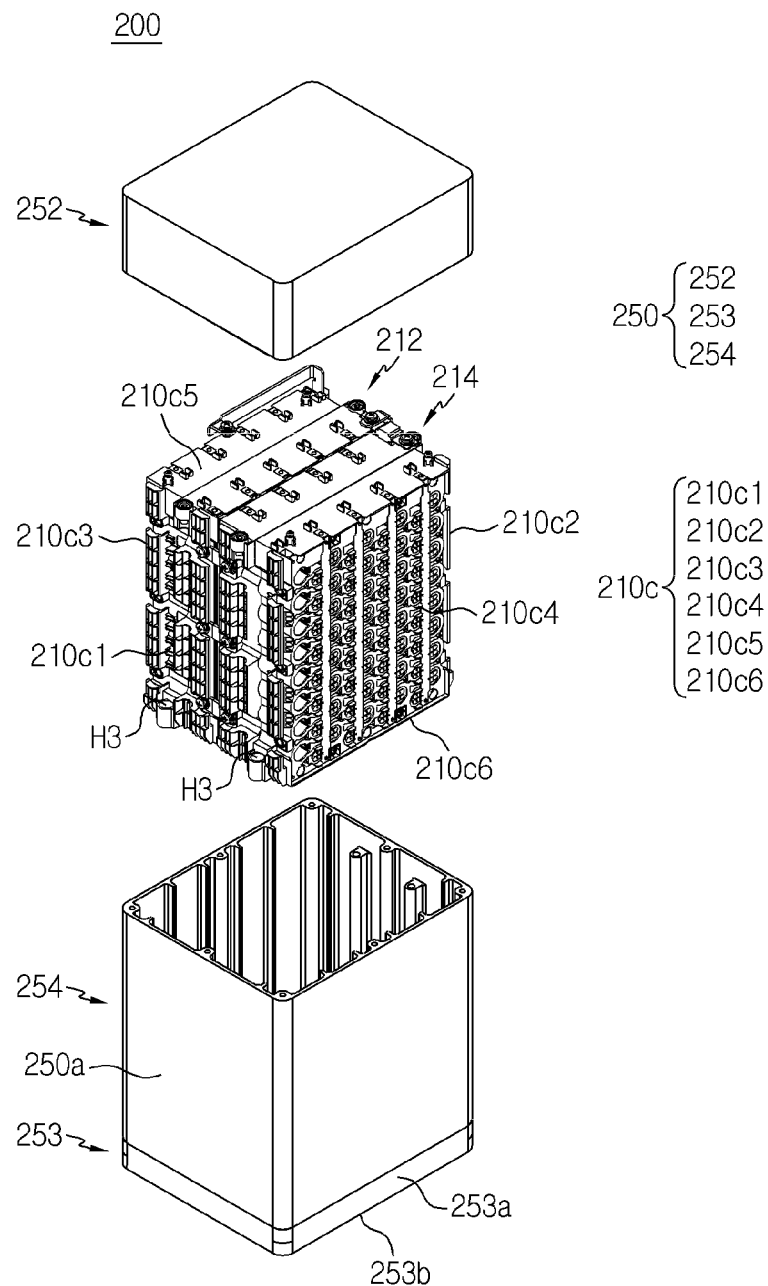
FIG. 3 is an exploded perspective view schematically showing some separated components of a battery pack according to an embodiment of the present disclosure.
Figure 4:
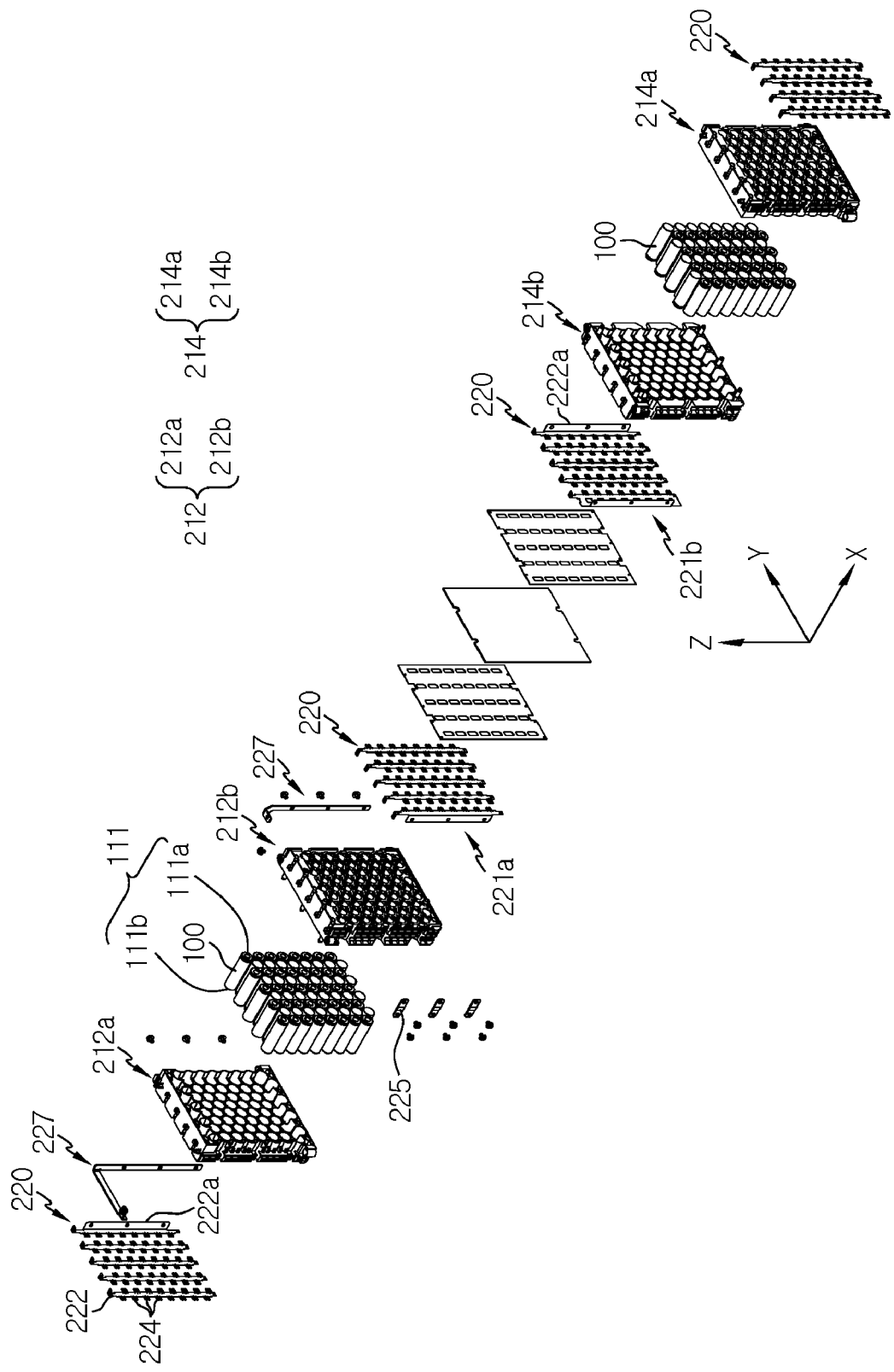
FIG. 4 is an exploded perspective view schematically showing some separated components of a battery pack according to an embodiment of the present disclosure.

FIG. 1 is a perspective view schematically showing a battery pack manufactured by using a bolting device according to an embodiment of the present disclosure. FIG. 2 is an exploded perspective view schematically showing separated components of a bolting device according to an embodiment of the present disclosure. FIG. 3 is an exploded perspective view schematically showing some separated components of a battery pack according to an embodiment of the present disclosure. FIG. 4 is an exploded perspective view schematically showing some separated components of a battery pack according to an embodiment of the present disclosure. Here, in FIG. 2, for convenience of description of the drawing, a part of an end portion of a bit guide member 330 is removed such that a driver bit 320 may be seen to the outside. That is, there is no part of the end portion of the bit guide member 330 that is actually opened in the horizontal direction.

Referring to FIGS. 1 to 4, a bolting device 300 according to the present disclosure may be configured to manufacture a battery pack 200 provided with a pack housing 250 and module cases 212 and 214.

In addition, the bolting device 300 may include an electric screwdriver 310, a driver bit 320, a bit guide member 330, and a guide jig 340.

Here, the electric driver 310 may be provided with a body 312 in which a space that accommodates the internal configuration therein is formed, and a rotation motor 313 accommodated in the body 312. Further, the rotation motor may be an electric motor. Further, the electric screwdriver 310 may be configured to rotate screw bolts (219 of FIG. 9) by electric. Moreover, a decelerator may be provided in the motor.

In addition, a bit holder 315 capable of replacing various types of driver bits 320 may be provided in the end portion of the body 312. The end portion of the driver bit 320 may be inserted into the bit holder 315. Specifically, the bit holder 315 may be configured to insert and receive the end portion of the driver bit 320 in a direction opposite to the bolt fastening direction thereon. That is, the bit holder 315 may be configured to transfer the rotation force of the rotation motor to the driver bit 320 in a state where the driver bit 320 is inserted.

Furthermore, the electric driver 310 may be provided with a control unit (not shown) capable of controlling rotation of the driver bit 320. Specifically, the control unit may be configured to forward or reverse rotate the rotation motor. Therefore, the control unit may be provided with, for example, a switch button. Then, the electric driver 310 may operate the switch button to forward rotate the rotation motor and transfer the rotation force to the driver bit 320, and the driver bit 320 may hold and turn the head of a bolt (219 of FIG. 9) to tighten the bolt or to reverse rotate the rotation motor and disassemble the fastened state of the bolt (219 of FIG. 9) through the driver bit 320.

The electric driver 310 according to another embodiment may be provided with a moving unit (not shown) configured to supply and move the driver bit 320 in the bolt fastening direction (a lower direction) or to return and move the driver bit 320 in the opposite direction (an upper direction) of the bolt fastening direction. In addition, the moving unit may be provided with a moving shaft (317 shown in FIG. 9) to move the driver bit 320 in the bolt fastening direction or to move the driver bit 320 to return in the opposite direction. That is, the moving shaft may be provided with a mounting groove (not shown) to be fixed and connected to the driver bit 320 in the end portion.

Moreover, the driver bit 320 may be configured to be connected to the rotation motor and rotate the bolt head to enable rotation movement of the electric driver 310. For example, the end portion of the driver bit 320 may have a hexagonal body 322. In addition, the driver bit 320 may be provided with various types of structures on the end portion that is inserted into and fixed to a groove formed in the bolt head, according to the shape of the groove formed in the bolt head. For example, a cross bit blade, a straight bit blade, or a hexagonal shape may be provided on the end portion of the driver bit 320 that is inserted into and fixed to the bolt head.

The bit guide member 330 may be provided with a hollow tube 332. The hollow tube 332 may have an internal size (a hollow size) such that the driver bit 320 is inserted inside and movable. For example, the hollow tube 332 may have a hollow cylindrical shape. Furthermore, the hollow tube 332 may have a length corresponding to the inner depth of the pack housing 250.

In addition, the guide jig 340 may have a main body 340a having a plate shape and configured to be mounted on the upper portion of the pack housing 250. At least one through hole H1 may be formed in the main body 340a. Moreover, the guide jig 340 may be provided with a fixing member 342 that is inserted into and fixed to the through hole H1.

The fixing member 342 may have a part protruding in a direction in which the module case 212 is located. That is, the fixing member 342 may have a part protruding downward from the main body 340a of the plate shape.

Furthermore, the fixing member 342 may be formed with an insertion hole H2 that is perforated such that the bit guide member 330 is inserted. That is, the bit guide member 330 may be inserted into the insertion hole H2 of the fixing member 342 to have a shape erected in the up and down direction. Furthermore, the fixing member 342 may be configured to enable the bit guide member 330 to be fixed in a vertical state from the ground.

For example, as shown in FIGS. 1 and 2, the guide jig 340 may be provided with four fixing members 342 inserted into four through holes H1 of the main body 340a. Each of the four fixing members 342 may be formed with the insertion hole H2 that is perforated into which the bit guide member 330 is inserted.

Therefore, according to this configuration of the present disclosure, by providing the guide jig 340 provided with the main body 340a mounted on the upper portion of the pack housing 250 and the fixing member 342 that fixes the bit guide member 330, it is possible to accurately set an insertion position of the driver bit 320 in advance and more stably fix the bit guide member 330, thereby during a bolting operation, preventing the occurrence of bolting defects due to an operation impact in advance and shortening the bolting operation time, and thus manufacturing efficiency may be greatly increased.

In addition, at least two fixing protrusions 344 bulging in the outer direction (the lower direction) to be inserted into and fixed to the upper end of the pack housing 250 may be formed in the main body 340a of the guide jig 340. Specifically, the fixing protrusion 344 may be configured such that a bulging outer surface contacts an outer surface of the upper end of the pack housing 250. That is, a plurality of fixing protrusions 344 are inserted into the outside of the outer circumference of the upper end of the pack housing 250 such that the guide jig 340 may be fixed to the upper end of the pack housing 250 not to shaking.

For example, as illustrated in FIG. 2, four fixing protrusions 344 may be provided on the main body 340a of the guide jig 340. Each of the four fixing protrusions 344 may be configured to be inserted into and fixed to the outside of four corner parts of the open upper end of the pack housing 250.

Therefore, according to this configuration of the present disclosure, by forming the fixing protrusion 344 bulging in the outer direction to be inserted into and fixed to the upper end of the pack housing 250 in the main body 340a of the guide jig 340, since the guide jig 340 may be stably fixed to the upper end of the pack housing 250, the bit guide member 330 may be more stably fixed, thereby during the bolting operation, preventing the occurrence of bolting defects due to the operation impact in advance and shortening the bolting operation time, and thus manufacturing efficiency may be greatly increased.

Here, the module case 212 may be configured to accommodate a plurality of secondary batteries. In addition, the secondary battery 100 may be provided with an electrode assembly (not shown), a battery can, and a cap assembly.

The electrode assembly may have a structure wound with a separator interposed between a positive electrode plate and a negative electrode plate, a positive electrode tab is attached to the positive electrode plate and connected to the cap assembly, and a negative electrode tab is attached to the negative electrode plate and connected to the bottom end of the battery can.

The battery can may have an empty space formed therein to accommodate the electrode assembly. In particular, the battery can may has a cylindrical or square shape and may be configured with an open top end. In addition, the battery can may be formed of a metal material such as steel or aluminum to secure rigidity and the like. In addition, the battery can may have the bottom end to which the negative electrode tab is attached such that the lower portion of the battery can and the battery can itself may function as a negative electrode terminal.

The cap assembly may be coupled to the top opening portion of the battery can to seal the open end of the battery can. The cap assembly may have a shape such as a circular shape or a square shape according to the shape of the battery can, and may include sub-components such as a top cap, a safety vent, and a gasket.

Here, the top cap may be located on the uppermost portion of the cap assembly, may be configured to protrude in the upper direction. In particular, such a top cap may function as a positive electrode terminal 111a in the secondary battery 100. Accordingly, the top cap may be electrically connected to another secondary battery 100, a load, or a charging device through an external device, such as a bus bar 220. The top cap may be formed of, for example, a metal material such as stainless steel or aluminum.

The safety vent may be configured to deform when the internal pressure of the secondary battery, that is, the internal pressure of the battery can 112, increases to a certain level or more. In addition, the gasket may be formed of a material having electrical insulation such that the edge portions of the top cap and the safety vent may be insulated from the battery can.

The configuration of such a secondary battery 100 is well known to those skilled in the art at the time of filing of the present disclosure, and thus a more detailed description thereof will be omitted. In addition, the battery pack 200 according to the present disclosure is not limited to the configuration of the specific can type secondary battery 100. That is, the various secondary batteries 100 known at the time of filing of the present disclosure may be employed in the battery pack 200 according to the present disclosure. For example, the secondary battery 100 of FIG. 4 is illustrated with respect to the cylindrical secondary battery 100, but the square secondary battery may be applied to the battery pack 200 according to the present disclosure.

Referring to FIG. 4 again, the plurality of secondary batteries 100 may be provided to be arranged in the front and back direction (Y direction) and the up and down direction (Z direction). For example, as illustrated in FIG. 4, the plurality of secondary batteries 100 may be configured to be arranged in the front and back direction. In addition, the plurality of secondary batteries 100 may be configured to be arranged in the up and down direction. Moreover, the plurality of secondary batteries 100 may be arranged in which portions formed in a tubular shape in a cylindrical battery can face each other.

In particular, in the battery pack 200 according to the present disclosure, the plurality of secondary batteries 100 may be configured to be laid down in a horizontal direction. Here, the horizontal direction means a direction parallel to the ground. That is, as illustrated in FIG. 4, each secondary battery 100 may be configured to be elongated in a left and right direction (X-axis direction of the drawing). At this time, in some of the all secondary batteries 100, the positive electrode terminal 111a and the negative electrode terminal 111b may be located in the left and right directions, respectively when viewed in the F direction of FIG. 1. In addition, in the remaining secondary batteries 100, the positive electrode terminal 111a and the negative electrode terminal 111b of each can type secondary battery 100 may be located in the right and left directions, respectively.

Meanwhile, the terms indicating directions such as front, back, left, right, up and down described herein may vary depending on the position of an observer or the form in which an object is placed. However, in the present specification, for convenience of description, the directions of front, back, left, right, up, and down are identified and shown with respect to when viewed in the F direction.

Therefore, according to this configuration of the present disclosure, the height of the battery pack 200 may be configured to be low. That is, when the secondary battery 100 is laid down, the battery pack 200 having a shorter height may be configured. Therefore, it is easy to design the battery pack 200 of a low overall height.

Referring to FIG. 3 again, the battery pack 200 of the present disclosure may be configured such that the two or more module cases 212 and 214 are electrically connected to each other. Specifically, the battery pack 200 may be configured such that the other module case 214 is stacked on the left or right side of the one module case 212. For example, as illustrated in FIG. 3, when viewed in the F direction, the battery pack 200 may be provided with the first module case 212 and the second module case 214 located on the right side of the first module case 212.

Furthermore, an empty space may be formed in the module case 212 to accommodate the plurality of secondary batteries 100. Specifically, the module case 212 may be provided with an outer wall 210c. The outer wall 210c may be formed to surround the empty space formed therein to accommodate the plurality of secondary batteries 100.

When viewed in the F direction of FIG. 1, each of the module cases 212 and 214 may be provided with a first outer wall 210c1, a second outer wall 210c2, a third outer wall 210c3, a fourth outer wall 210c4, a fifth outer wall 210c5, and a sixth outer wall 210c6 that are formed in the front, back, up, down, left, and right directions to form the inner space. For example, as shown in FIG. 3, each of the first module case 212 and the second module case 214 may be provided with the first outer wall 210c1, the second outer wall 210c2, the third outer wall 210c3, the fourth outer wall 210c4, the fifth outer wall 210c5, and the sixth outer wall 210c6.

Accordingly, according to this configuration of the present disclosure, the module case 212 is provided with the outer wall 210c, thereby effectively protecting the plurality of secondary batteries 100 accommodate therein from external impact.

In addition, the at least two secondary batteries 100 may be accommodated to be laid down in the horizontal direction (X-axis direction) in the inner space of the module case 212. The stack direction is not necessarily limited to one direction, and may be the up and down direction (Z-axis direction) according to a direction in which the secondary battery 100 is laid down. For example, as illustrated in FIG. 4, the at least two secondary batteries 100 may be accommodated to be laid down in the left and right direction (X-axis direction) in the inner space of each of the first module case 212 and the second module case 214.

The first module case 212 may be provided with a first frame 212a and a second frame 212b. Here, the first frame 212a and the second frame 212b may be configured to meet and join each other in one side and the other side in the left and right direction (X direction). For example, in the configuration of FIG. 4, when viewed in the F direction of FIG. 1, the first frame 212a may be disposed on the left side of the plurality of secondary batteries 100 to accommodate the left portions of the plurality of secondary batteries 100. In addition, the second frame 212b may be positioned on the right side of the plurality of secondary batteries 100 to accommodate the right portions of the plurality of secondary batteries 100.

In particular, the first frame 212a and the second frame 212b may be configured to cover one side and the other side of the plurality of secondary batteries 100, respectively, to wholly cover the outer surface of the secondary batteries 100 excluding the electrode terminal 111. For example, when the secondary battery 100 is the cylindrical secondary battery 100, the first frame 212a and the second frame 212b wholly cover the outer surface of the cylindrical battery, such that the side surface of the secondary battery 100 in the up and down direction may be configured not to be exposed to the outside of the battery pack 200.

For example, as shown in FIG. 4, the first frame 212a may be disposed on the left side of the plurality of secondary batteries 100 to accommodate the left portions of the plurality of secondary batteries 100. In addition, the second frame 212b may be positioned on the right side of the plurality of secondary batteries 100 to accommodate the right portions of the plurality of secondary batteries 100.

Likewise, the second module case 214 may be provided with a first frame 214a and the second frame 214b of the same structure as that of the first frame 212a and the second frame 212b of the first module case 212.

Therefore, according to this configuration of the present disclosure, since the side exposure of the secondary battery 100 is blocked by the module case 212, the insulating property of the secondary battery 100 may be improved, and the secondary battery 100 may be protected from external physical and chemical factors.

Furthermore, the second module case 214 may be provided with the first frame 214a and the second frame 214b. Here, when the first frame 214a and the second frame 214b are compared with the first frame 212a and the second frame 212b of the first module case 212 described above, the first frame 214a and the second frame 214b may have the same configuration, except that the left and right positions of the first frame 214a and the second frame 214b are reversely arranged. Specifically, when the front and rear positions of the second module case 214 rotate by 180 degrees, the first frame 214a and the second frame 214b of the second module case 214 may have the same arrangement as the first frame 212a and the second frame 212b of the first module case 212.

Accordingly, the first frame 214a and the second frame 214b of the second module case 214 have the same shapes as the first frame 212a and the second frame 212b of the first module case 212, and thus detailed descriptions of the first frame 214a and the second frame 214b of the second module case 214 will be omitted.

In addition, in the present disclosure, the bus bar 220, as shown in FIG. 4, may be provided with a body portion 222 and the connection portion 224. The body portion 222 of the bus bar 220 may be configured in a plate shape. Moreover, the bus bar 220 may be configured in the form of a metal plate to ensure rigidity and electrical conductivity. In particular, the body portion 222 may be configured to be erected in the up and down direction (Z-axis direction of the drawing) along the electrode terminals 111 of the plurality of secondary batteries 100.

That is, in the present disclosure, when the plurality of secondary batteries 100 are lengthily laid down in the left and right direction (X-axis direction of the drawing) and arranged in the front and back direction (Y-axis direction of the drawing) and/or the up and down direction (Z-axis direction of the drawing), the electrode terminals 111 of the various secondary batteries 100 may be configured to be arranged in parallel in the front and back direction and the up and down direction. At this time, the body portion 222 may be configured to be erected flat in the front and back direction or the up and down direction as a plate shape according to the arrangement direction of the electrode terminals 111 of the plurality of secondary batteries 100.

Moreover, the body portion 222 of the bus bar 220 may be configured to have an upper end portion bent in the inner direction. In addition, the upper end portion of the body portion 222 of the bus bar 220 may be a portion for sensing a voltage by a sensing member (not shown).

Specifically, the connection portion 224 may be configured to contact (join) the electrode terminals 111 of the plurality of secondary batteries 100 so as to electrically connect the plurality of secondary batteries 100. In addition, a plurality of the connection portions 224 may be formed to extend from the body portion 222 in the front and back direction (Y direction). For example, the connection portions 224 may contact the electrode terminals 111 of some secondary batteries 100 among all the secondary batteries 100 to electrically connect the plurality of secondary batteries 100.

Moreover, the connection portion 224 may contact the same polarity of the plurality of secondary batteries 100 and connect them in parallel. Alternatively, the connection portion 224 may contact and electrically connect the electrode terminals 111 of some secondary batteries 100 in parallel and in series among all the secondary batteries 100.

In addition, the battery pack 200 may include a connection bus bar 225. Specifically, the connection bus bar 225 may be configured to electrically connect the two or more bus bars 220. For example, as shown in FIGS. 3 and 4, the battery pack 200 may be provided with three connection bus bars 225. The connection bus bar 225 may be configured such that one side is connected to a bus bar 221a of the one module case 212 and the other side is connected to another bus bar 221b of the other module case 214.

Furthermore, the battery pack 200 may include an external bus bar 227. Specifically, the external bus bar 227 may serve as a final external input/output electrical terminal of the battery pack 200. To this end, the external bus bar 227 may be configured to contact a part of the bus bar (222a of FIG. 4). For example, as illustrated in FIG. 4, the battery pack 200 may be provided with two external bus bars 227 that serve as an external input/output positive electrode terminal and an external input/output negative electrode terminal.

Here, the pack housing 250 may have a box shape in which a partial component (an intermediate case 254) has an open upper portion. An inner space may be formed in the pack housing 250 to accommodate the module case 212. Specifically, the pack housing 250 may be provided with an outer wall 250a configured to form the inner space.

The pack housing 250 may include an upper cap 252, an intermediate case 254, and a lower support portion 253. Specifically, when viewed in the F direction, the intermediate case 254 may be coupled to the lower portion of the upper cap 252, and the lower support portion 253 may be coupled to the lower portion of the intermediate case 254.

More specifically, the upper cap 252 may be provided with an upper wall and a side wall to cover an upper portion of the module case 212 accommodated inside the pack housing 250. The intermediate case 254 may have a square tubular shape opened in the up and down direction. Further, the lower support portion 253 may be a box shape with an open upper portion and provided with a side wall 253a and a lower wall 253b.

Figure 5:
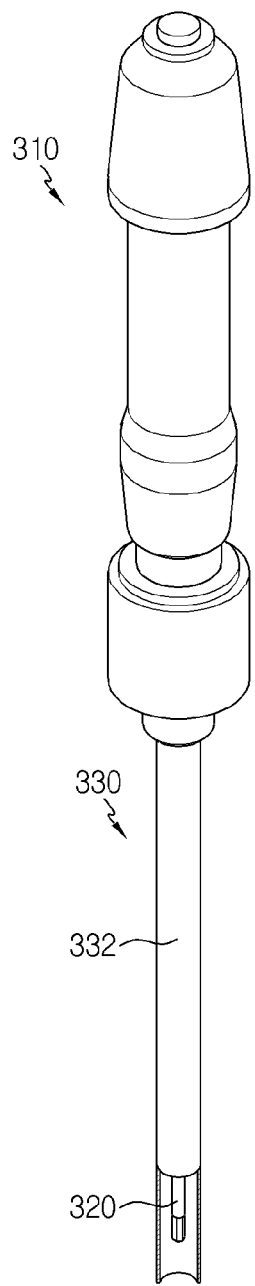
FIG. 5 is a perspective view schematically showing some components of a bolting device according to an embodiment of the present disclosure.

FIG. 5 is a perspective view schematically showing some components of a bolting device according to an embodiment of the present disclosure. Here, in FIG. 5, for convenience of description of the drawing, a cross-section of a part of the lower portion of a bit guide member is shown such that the inside of the bit guide member 330 may be viewed.

Referring to FIG. 5 together with FIG. 5, the bit guide member 330 may have a configuration in which an end portion of the hollow tube 332 in the elongated direction is coupled to the electric driver 310. For example, as shown in FIG. 5, the upper end of the bit guide member 330 may have a shape coupled to the outer periphery of a part (the bit holder 315) to which the driver bit 320 of the electric driver 310 is coupled.

Therefore, according to this configuration of the present disclosure, the bit guide member 330 is configured such that the end portion of the hollow tube 332 in the elongated direction is coupled to the electric driver 310, and thus during a bolting operation, it is possible to prevent the driver bit 320 from colliding with the pack housing 250 and the module case 212 in advance, thereby preventing damage to the internal structure of the battery pack 200.

Figure 6:
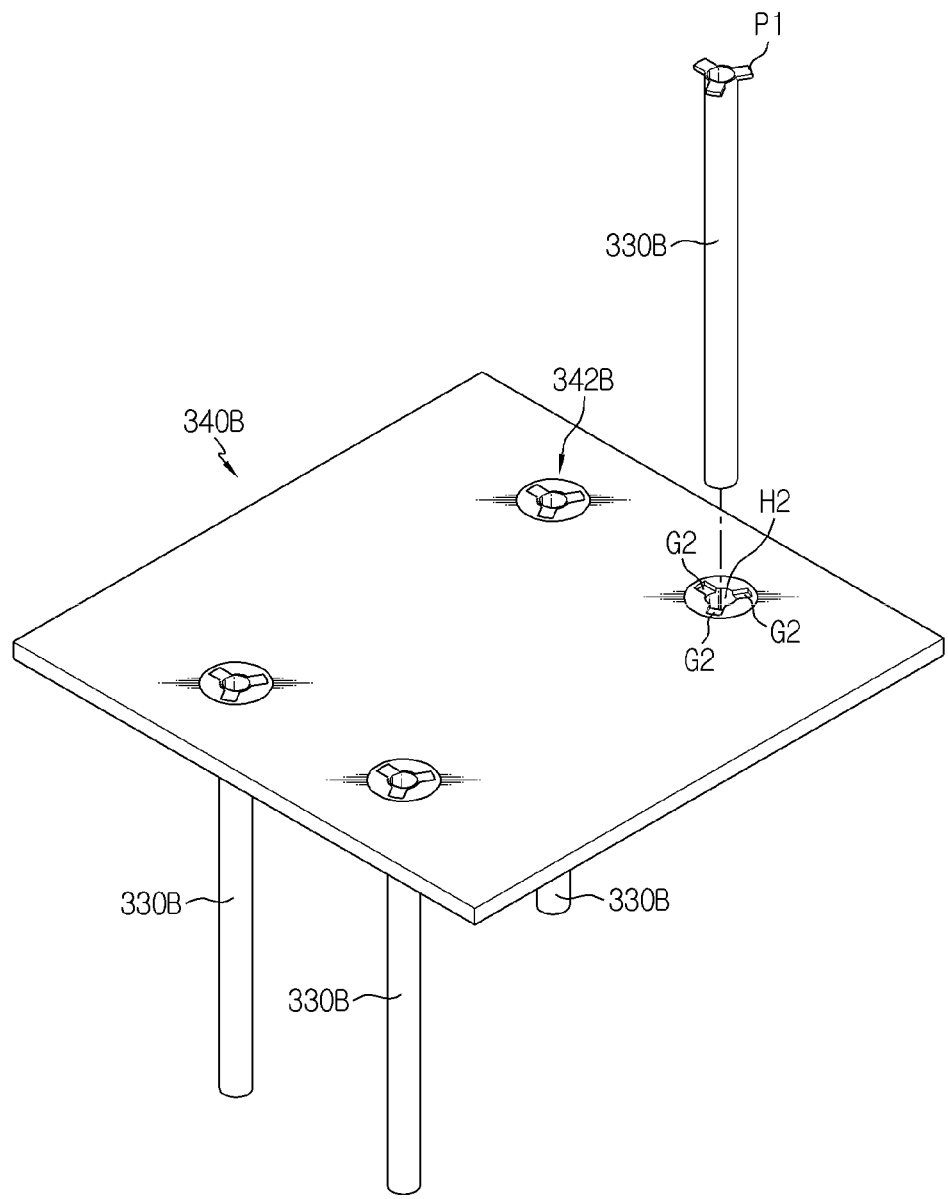
FIG. 6 is a perspective view schematically showing some components of a bolting device according to another embodiment of the present disclosure.

FIG. 6 is a perspective view schematically showing some components of a bolting device according to another embodiment of the present disclosure. Here, in FIG. 6, for convenience of description of the drawing, one bit guide member 330B separated from a fixing member 342B in the upper direction is shown.

Referring to FIG. 6 together with FIG. 2, a bit guide member 330B may be a configuration in which a part (an upper part) of the hollow tube 332 is inserted into and coupled to the insertion hole H2 of the fixing member 342B mounted on a guide jig 340B. For example, as illustrated in FIG. 6, the upper ends of four bit guide members 330B may be respectively inserted into and coupled to the insertion holes H2 of four fixing members 342B provided in the guide jig 340B.

Therefore, according to this configuration of the present disclosure, the bit guide member 330B is configured such that a part of the hollow tube 332 is inserted into and coupled to the insertion hole H2 of the fixing member 342B, and thus when an operator performs a bolting operation using the bolting device 300, it is unnecessary to insert the bit guide member 330B into the insertion hole H2 of each of the four fixing members 342B, the bolting device according to another embodiment has an advantage of greatly shortening the bolting operation time.

In addition, at least one mounting groove G2 indented in the inner direction (the lower direction) may be provided on the upper surface of the fixing member 342B. Moreover, the mounting groove G2 may have a shape extending from the insertion hole H2. For example, as illustrated in FIG. 6, three mounting grooves G2 may be formed in each of the four fixing members 342B. Each of the three mounting grooves G2 may have a shape extending from the insertion hole H2 perforated in the center of the fixing member 342B.

The bit guide member 330B may be provided with a fixing protrusion P1 configured to be inserted into and fixed to the mounting groove G2. The fixing protrusion P1 may have a shape protruding and extending from the upper end of the hollow tube 332 in the outer direction (the horizontal direction). For example, each of the four bit guide members 330B may be provided with three fixing protrusions P1. The three fixing protrusions P1 may be respectively mounted on and fixed to the three mounting grooves G2 formed in the upper surface of the fixing member 342B.

Therefore, according to this configuration of the present disclosure, the at least one mounting groove G2 is provided in the upper surface of the fixing member 342B, and the bit guide member 330B is provided with the fixing protrusion P1 to be inserted into and fixed to the mounting groove G2, and thus the bolting device according to another embodiment may prevent the bit guide member 330B from shaking during a rotation movement of the driver bit 320, and in particular, may improve the fixing force capable of maintaining the state in which the driver bit 320 is erected vertically.

Meanwhile, referring to FIG. 3 again, the module case 212 may be provided with the coupling hole H3 which is formed to protrude in the outer direction from the outer wall 210c and which is perforated such that a bolt (219 of FIG. 9) body is inserted and fixed. For example, as shown in FIG. 3, when viewed in the F direction, each of the module cases 212 and 214 may be provided with one coupling hole H3 in each of the front side and the rear side. That is, the total of four coupling holes H3 may be located in the lower ends of the module cases 212 and 214. A hollow may be formed in the coupling hole H3 in the up and down direction.

Figure 7:
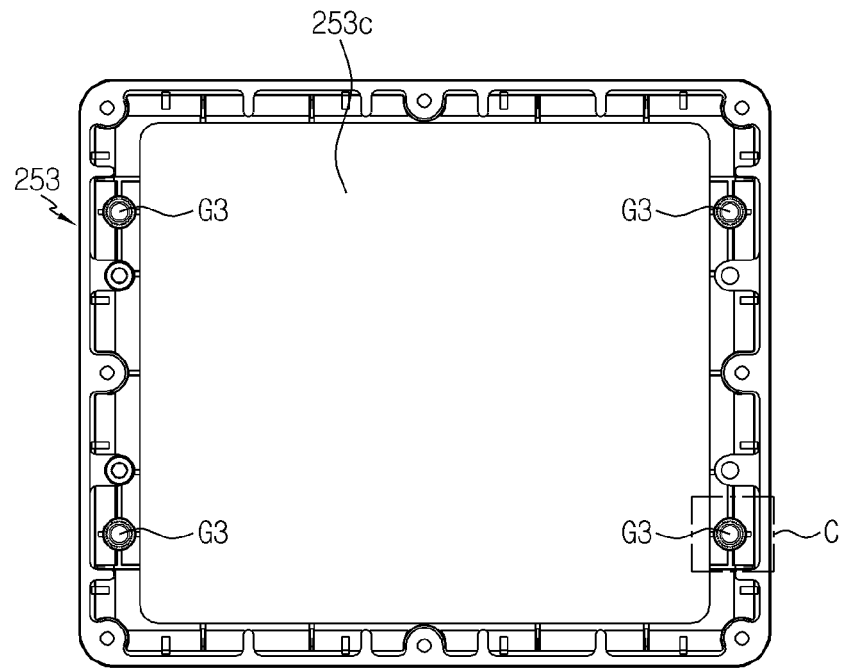
FIG. 7 is a perspective view schematically showing an inside of a pack housing which is a partial component of a battery pack according to an embodiment of the present disclosure.
Figure 8:
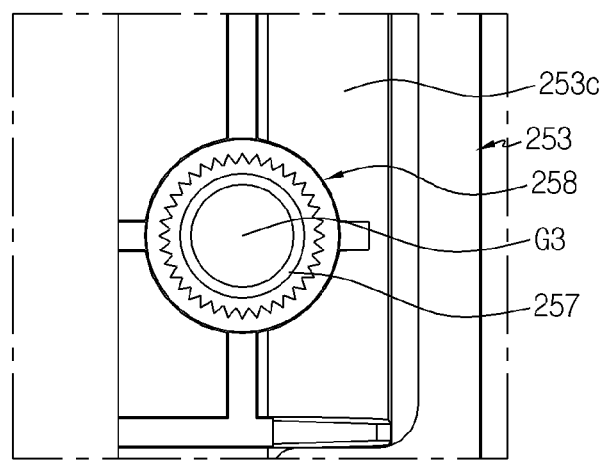
FIG. 8 is a partially enlarged perspective view schematically showing a C region of the pack housing of FIG. 7.

FIG. 7 is a perspective view schematically showing an inside of a pack housing which is a partial component of a battery pack according to an embodiment of the present disclosure. FIG. 8 is a partially enlarged perspective view schematically showing a C region of the pack housing of FIG. 7.

Referring to FIGS. 7 and 8 together with FIG. 3, a pack housing 250 may be provided with a fastening unit 258 configured to bolt couple the module case 212 and a lower support portion 253 of the pack housing 250 to each other. A coupling groove G3 may be provided in the fastening unit 258. Specifically, the coupling groove G3 may be connected with a coupling hole H3 of the module case 212 and the bolt body may be inserted into and fixed to the coupling groove G3. A nut 257 provided with a thread may be embedded inside the coupling groove G3.

For example, as shown in FIG. 7, four coupling grooves G3 bulging from an inner bottom surface 253c in the upper direction may be provided in the lower support portion 253 coupled to the lower portion of the intermediate case 254 of the pack housing 250. The nut 257 may be embedded in each of the four coupling grooves G3.

Accordingly, according to this configuration of the present disclosure, the module case 212 is provided with the coupling hole H3 protruding in the outer direction from the outer wall 210c and perforated such that the bolt body is to be inserted and fixed, and the pack housing 250 is provided with the coupling groove G3 such that the module case 212 and the pack housing 250 are bolt coupled to each other, and thus the module case 212 may be accommodated in a right position inside the pack housing 250 and the module case 212 may be fixed to the inside of the pack housing 250 with a high coupling force.

Figure 9:
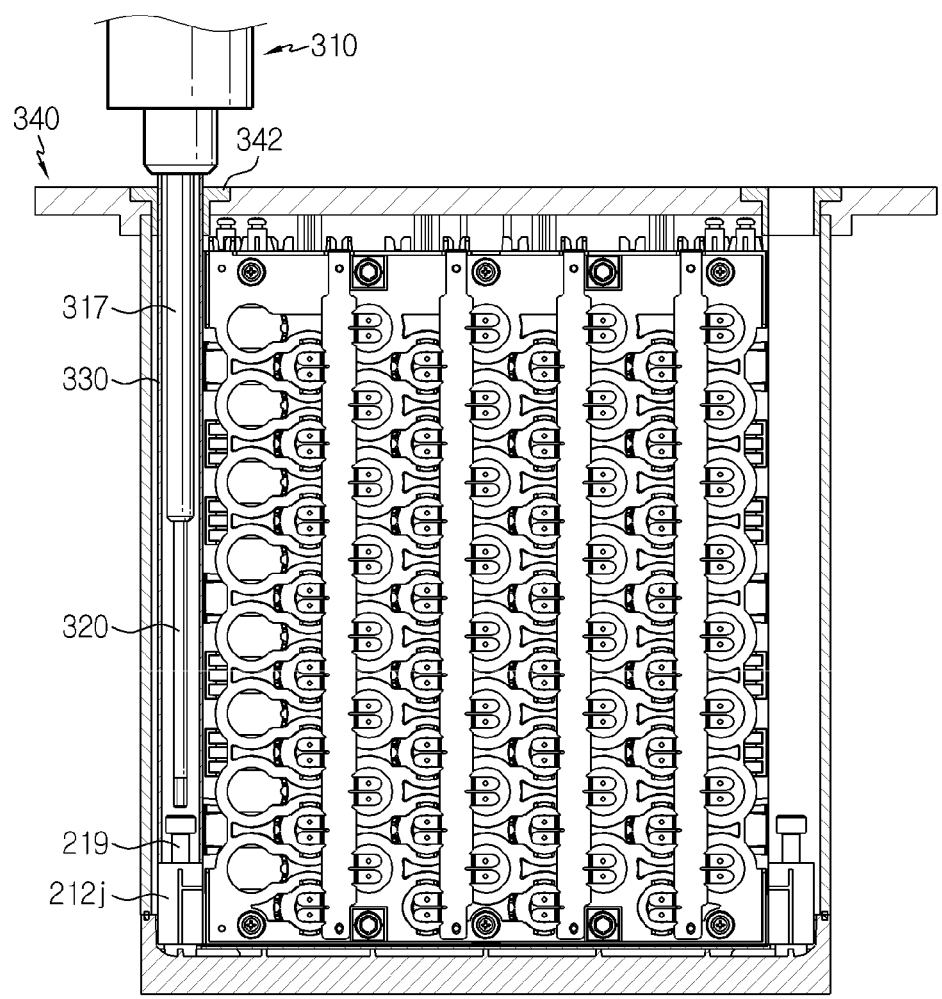
FIG. 9 is a cross-sectional view schematically showing a battery pack manufactured by using the bolting device of FIG. 1.

FIG. 9 is a cross-sectional view schematically showing a battery pack manufactured by using the bolting device of FIG. 1. In FIG. 9, for convenience of description of the drawing, a vertical cross-sectional view of the bit guide member 330 is shown such that the inside of the bit guide member 330 is visible to the outside.

Referring to FIG. 9 together with FIGS. 1 and 2, the guide jig 340 may be mounted on the upper portion of the pack housing 250. At this time, the bit guide member 330 may be inserted into and fixed to the insertion hole H2 of the fixing member 242. The bit guide member 330 may be mounted on the upper portion of a coupling portion 212j in which the coupling hole (H3 of FIG. 3) of the module case 212 is formed.

Therefore, according to this configuration of the present disclosure, the bit guide member 330 is configured to extend from the guide jig 340 to the coupling portion 212j, thereby when the drive bit 320 performs a rotation movement, preventing collision with the internal components of the battery pack 200, for example, the module case 120, the bus bar 220, etc. Accordingly, the defective rate of the battery pack may be reduced.

Figure 10:
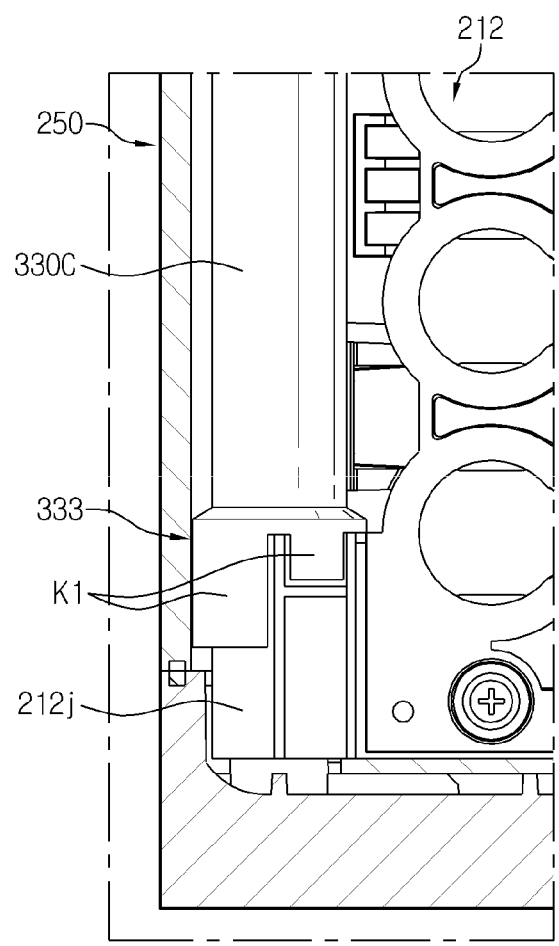
FIG. 10 is a partial cross-sectional view schematically showing some components of a bolting device according to another embodiment of the present disclosure.

FIG. 10 is a partial cross-sectional view schematically showing some components of a bolting device according to another embodiment of the present disclosure.

Referring to FIG. 10 together with FIGS. 3 and 9, a bit guide member 330C may be provided with a fixing portion 333 configured to fix the end portion of the bit guide member 330C to the peripheral portion of the coupling hole H3 of the module case 212. The fixing portion 333 may be provided in an end portion where a bolt of the bit guide member 330C is ejected. At this time, the fixing portion 333 is not particularly limited to means for fixing the end portion of the bit guide member 330C to the peripheral portion of the module case 212 but a separate fastening member may be used, or a separate fixing structure capable of binding with the coupling portion 212j of the module case 212 may be formed in the end portion of the bit guide member 330C.

Accordingly, according to this configuration of the present disclosure, the bit guide member 330C is provided with the fixing portion 333 configured to fix the end portion of the bit guide member 330C to the peripheral portion of the coupling hole H3 of the module case 212, and thus the upper portion of the bit guide member 330C is fixed by the guide jig 340 not to shaking, and the lower portion of the bit guide member 330C is fixed by the fixing portion 333 not to shaking. Accordingly, since both the upper and the lower ends of the bit guide member 330C are stably fixed, the bolting device of the present disclosure may prevent a problem in which the bit guide member 330C escapes from the right position during a bolting operation, thereby effectively reducing a defective rate and the bolting operation and an operation time.

Moreover, the fixing portion 333 may be provided with a hook structure K1 protruding and extending from the end portion of the bit guide member 330C so as to surround the coupling portion 212j. For example, as shown in FIG. 10, the bit guide member 330C may be provided with a plurality of hook structures K1 protruding and extending from the lower end thereof in the lower direction. The hook structure K1 may have a shape that is bent twice and extends in the horizontal direction and in the lower direction so as to correspond to the outer shape of the coupling hole H3 of the module case 212.

Therefore, according to this configuration of the present disclosure, the fixing portion 333 is provided with the hook structure K1 protruding and extending from the end portion of the bit guide member 330C to surround the peripheral portion of the coupling hole H3, and thus the hook structure K1 of the bit guide member 330C may be closely fixed to the peripheral portion of the coupling hole H3 of the module case 212. Accordingly, when the bolting device 300 is used, the shaking width of the bit guide member 330C may be effectively reduced. Furthermore, during the bolting operation, the bit guide member 330C may be effectively prevented from escaping from the coupling portion 212j of the module case 212.

Figure 11:
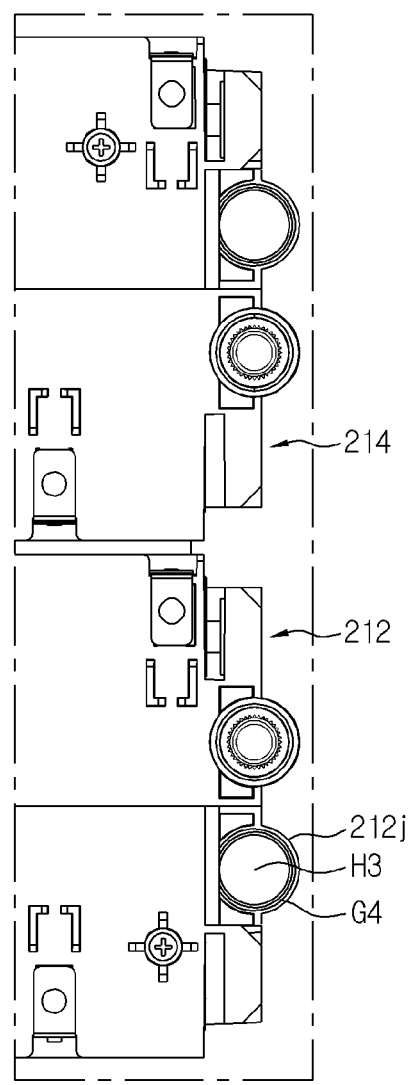
FIG. 11 is a partial plan view schematically showing a part of a module case according to another embodiment.
Figure 12:
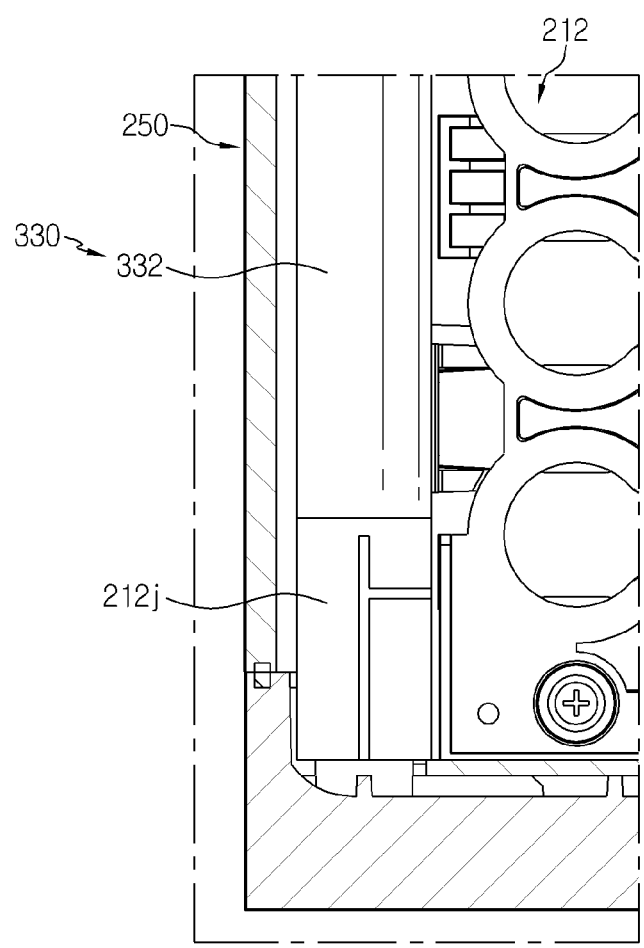
FIG. 12 is a partial cross-sectional view schematically showing some components of a bolting device according to another embodiment of the present disclosure.

FIG. 11 is a partial plan view schematically showing a part of a module case according to another embodiment. FIG. 12 is a partial cross-sectional view schematically showing some components of a bolting device according to another embodiment of the present disclosure.

Referring to FIGS. 11 and 12, a linear insertion groove G4 indented in the lower direction in the peripheral portion (the combination portion 212j) of the coupling hole H3 may be formed in each of the module cases 212 and 214. Specifically, the insertion groove G4 may have a planar shape corresponding to the end portion of the bit guide member 330 in the bolt fastening direction.

For example, as shown in FIG. 11, when the planar shape of the end portion of the bit guide member 330 in the bolt fastening direction is circular, the insertion groove G4 may be circular in the planar shape viewed from the upper portion to the lower portion. The indented size of the insertion groove G4 may be sufficient as long as it is fixed and does not easily escape if the end portion of the bit guide member 330 is inserted.

In addition, the bit guide member 330 may be configured such that the end portion in the bolt fastening direction is inserted into the insertion groove G4 formed in the peripheral portion of the coupling hole H3 of the module case 212. For example, the insertion groove G4 may be formed in the peripheral portion of each of the four coupling holes H3 of the module case 212. In addition, during a bolting operation, after the end portion of the bit guide member 330 in the bolt fastening direction is inserted into each of the four insertion grooves G4, the bolt (219 of FIG. 9) and the nut (257 of FIG. 8) are fastened through the driver bit 320, thereby coupling the module cases 212 and 214 to the inside of the pack housing 250.

Accordingly, according to this configuration of the present disclosure, the bit guide member 330 is configured such that the end portion in the bolt fastening direction is inserted into the insertion groove G4 formed in the peripheral portion of the coupling hole H3 of the module case 212 such that the upper portion of the hollow tube 332 is fixed by the guide jig 340 and the lower end of the hollow tube 332 is inserted into and fixed to the insertion groove G4 of the module case 212, thereby not only guiding the driver bit 320 to be positioned on a correct position, but also effectively preventing the bit guide member 330 from escaping from the right position due to the impact of the driver bit 320 during the bolting operation. Accordingly, the defective rate of a manufacturing process of the battery pack 200 may be reduced, and manufacturing efficiency may be greatly improved.

Figure 13:
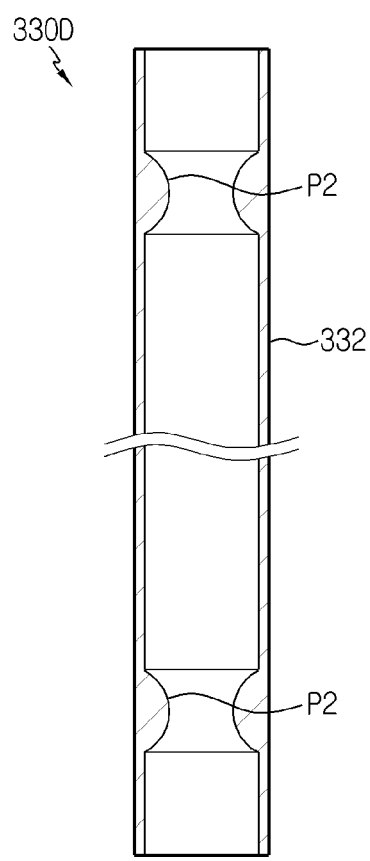
FIG. 13 is a vertical cross-sectional view schematically showing a bit guide member which is a partial configuration of a bolting device according to another embodiment of the present disclosure.

FIG. 13 is a vertical cross-sectional view schematically showing a bit guide member which is a partial configuration of a bolting device according to another embodiment of the present disclosure.

Referring to FIG. 12 together with FIG. 2, a bit guide member 330D according to another embodiment may be provided with a detection protrusion P2 configured to detect a degree of warpage of the driver bit 320. Specifically, the detection protrusion P2 may have a shape that protrudes and extends in the direction of the central axis of the hollow tube 332 on at least one part of the inner surface of the hollow tube 332. For example, as illustrated in FIG. 12, the detection protrusion P2 may be formed on each of the inner upper and lower portions of the hollow tube 332 of the bit guide member 330D. At this time, the detection protrusion P2 may have a belt shape extending along the inner circumference of the hollow tube 332.

That is, when the driver bit 320 already warps, insertion may be interrupted by the detection protrusion P2 while being inserted into the hollow tube 332 of the bit guide member 330D.

Accordingly, according to this configuration of the present disclosure, the bit guide member 330D is provided with the detection protrusion P2 configured to detect the degree of warpage of the driver bit 320 on the at least one part of the inner surface of the hollow tube 332, and thus an operator may easily detect that the driver bit 320 warps and prevent the use of the warped driver bit 320, thereby effectively preventing the damage of the internal configuration of the battery pack 200 due to a bolting operation.

Meanwhile, referring to FIG. 3, the battery pack 200 according to an embodiment of the present disclosure may be manufactured using the bolting device 300. The battery pack 200 may further include various devices (not shown) for controlling charging and discharging of the battery pack 200, for example, a battery management system (BMS), a current sensor, a fuse, etc.

Meanwhile, in the present specification, although the terms indicating directions such as up, down, left, right, front, and back are used, it is apparent to those skilled in the art that these terms are for convenience of explanation only and vary depending on the position of a target object or the position of an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

DESCRIPTION OF REFERENCE NUMERALS

| | |
|---|---|
| 300: bolting device | 310: electric screwdriver |
| 320: driver bit | 330: bit guide member |
| 332: hollow tube | 340: guide jig |
| H1: through hole | 342: fixing member |
| 340a: main body | H2: insertion hole |
| 344: fixing protrusion | G2: mounting groove |
| P1: fixing protrusion | H3: coupling hole |
| G3: coupling groove | 333: fixing portion |
| K1: hook structure | G4: insertion groove |
| P2: detection protrusion | |
| 200: battery pack | 100: secondary battery |
| 111, 111a, 111b: electrode terminal, positive electrode terminal, negative electrode terminal | |
| 212, 214: module cases | |
| 212a, 214a: first frames | 212b, 214b: second frames |
| 210c: outer wall | |
| 250: pack housing | 252: upper cap |
| 254: intermediate case | 253: lower support portion |

INDUSTRIAL APPLICABILITY

The present disclosure relates to a bolting device for manufacturing a battery pack. Further, the present disclosure is applicable to an industry related to the battery pack manufactured using the bolting device and a vehicle including the battery pack.

What is claimed is:

1. A bolting device for manufacturing a battery pack provided with a pack housing having a box shape with an open upper portion and a module case accommodating a plurality of secondary batteries, the bolting device comprising:
    an electric screwdriver provided with a rotation motor;
    a driver bit connected to the rotation motor to enable a rotation movement and configured to rotate a bolt;
    a bit guide member provided with a hollow tube such that the driver bit is inserted into an inside of the hollow tube to be movable; and
    a guide jig provided with a main body configured to be mounted on an upper portion of the pack housing, the main body having a plate shape and comprising:
    at least one through hole; and
    a fixing member inserted into the at least one through hole and mounted therein, the fixing member comprising an insertion hole that is perforated such that the bit guide member is able to be inserted therethrough, and the fixing member protruding in a direction in which the module case is located.

2. The bolting device of claim 1, wherein the main body further comprises a fixing protrusion bulging in the direction in which the module case is located, and the fixing protrusion is configured to be inserted into and fixed to an upper end of the pack housing.

3. The bolting device of claim 1, wherein the bit guide member is configured such that an end portion of the hollow tube in an elongated direction is coupled to the electric screwdriver.

4. The bolting device of claim 1, wherein the bit guide member is configured such that a part of the hollow tube is inserted into and coupled to the insertion hole of the fixing member.

5. The bolting device of claim 4, wherein at least one mounting groove extending from the insertion hole and indented in a lower direction is provided in an upper surface of the fixing member, and
    wherein the bit guide member is provided with a fixing protrusion protruding and extending in the direction in which the module case is located from an upper end of the hollow tube so as to be inserted into and fixed to the at least one mounting groove.

6. The bolting device of claim 1, wherein the bit guide member is accommodated in a coupling groove of the pack housing when the module case is provided with an outer wall forming an inner space accommodating the plurality of secondary batteries, and a coupling hole protruding in an outer direction from the outer wall and perforated such that a bolt body is inserted and fixed, and
    wherein the pack housing is formed with an inner space to accommodate the module case and is provided with the coupling groove communicating with the coupling hole of the module case such that the module case and the pack housing are bolt coupled to each other when the bolt body is inserted and fixed.

7. The bolting device of claim 6, wherein the bit guide member is provided with a fixing portion to fix an end portion of the bit guide member to a peripheral portion of the coupling hole of the module case.

8. The bolting device of claim 7, wherein the fixing portion is provided with a hook structure protruding and extending from the end portion of the hit guide member so as to surround the peripheral portion of the coupling hole.

9. The bolting device of claim 7, wherein the bit guide member is configured such that the end portion of the hit guide member in a bolt fastening direction is inserted into an insertion groove formed in the peripheral portion of the coupling hole of the module case.

10. The bolting device of claim 1, wherein the bit guide member is provided with a detection protrusion configured to detect a degree of warpage of the driver bit on at least one part of an inner surface of the hollow tube.

* * * * *